(12) United States Patent
Reid et al.

(10) Patent No.: US 11,097,966 B2
(45) Date of Patent: *Aug. 24, 2021

(54) METHOD OF OPERATING AN UPFLOW BACKWASH FILTER

(71) Applicants: John H. Reid, Fredericksburg, VA (US); Wade Tanner, Fredericksburg, VA (US)

(72) Inventors: John H. Reid, Fredericksburg, VA (US); Wade Tanner, Fredericksburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/553,835

(22) Filed: Aug. 28, 2019

(65) Prior Publication Data

US 2021/0061689 A1  Mar. 4, 2021

(51) Int. Cl.
*C02F 3/12* (2006.01)
*B01D 24/46* (2006.01)
(Continued)

(52) U.S. Cl.
CPC ........ *C02F 3/1221* (2013.01); *B01D 24/4689* (2013.01); *C02F 3/2826* (2013.01);
(Continued)

(58) Field of Classification Search
CPC ...... C02F 3/1221; C02F 3/2826; C02F 3/307; C02F 3/305; C02F 2001/007;
(Continued)

(56) References Cited

U.S. PATENT DOCUMENTS 3,709,364 A * 1/1973 Savage ............... C02F 3/10
                                              210/195.1
8,080,163 B2 * 12/2011 Moller ............... C02F 1/5245
                                              210/667

(Continued)

OTHER PUBLICATIONS

Ramalingam, K. et al., "Analyzing annamox", WE&T, www.weforg/magazine, Sep. 2012, pp. 56 to 59.

*Primary Examiner* — Fred Prince
(74) *Attorney, Agent, or Firm* — Walter Ottesen, P.A.

(57) ABSTRACT

Provided is a process comprising receiving overflow of wastewater influent from a clarifier basin in a clarifier effluent collection trough; receiving inflow of wastewater influent from the clarifier effluent collection trough in a filter influent flow inlet distribution channel; maintaining substantially constant liquid level in the filter influent inlet distribution channel; applying hydrostatic pressure to push wastewater influent from the filter influent flow inlet distribution channel into an upflow backwash filter contusing denitrifying biomass or deammonification biomass; backwashing the backwash filter with a gas lift backwash flow; returning filter reject backwash wastewater from rejection compartment of the filter through denitrifying bacteria or deammonification biomass recycle return line to a location upstream of the filter; and recycling denitrifying bacteria or deammonification biomass from denitrifying bacteria or deammonification biomass recycle return line to at least one of the clarifier effluent collection trough, filter influent flocculation tank, or filter influent flow distribution channel.

20 Claims, 5 Drawing Sheets

(51) Int. Cl.
*C02F 3/28* (2006.01)
*C02F 3/30* (2006.01)
*C02F 3/10* (2006.01)
*C02F 1/00* (2006.01)

(52) U.S. Cl.
CPC .............. *C02F 3/305* (2013.01); *C02F 3/307* (2013.01); *C02F 3/107* (2013.01); *C02F 3/1215* (2013.01); *C02F 2001/007* (2013.01); *C02F 2203/002* (2013.01); *C02F 2209/42* (2013.01); *C02F 2303/16* (2013.01)

(58) Field of Classification Search
CPC .. C02F 2303/16; C02F 3/107; C02F 2209/42; C02F 3/1215; C02F 2203/002; B01D 24/4689
USPC ....... 210/605, 615, 621, 623, 630, 631, 791, 210/797
See application file for complete search history.

(56) References Cited

U.S. PATENT DOCUMENTS

| | | | | |
|---|---|---|---|---|
| 2002/0079267 | A1* | 6/2002 | Savage | B01D 24/105 210/620 |
| 2006/0169636 | A1* | 8/2006 | Devine | B01D 61/147 210/605 |
| 2006/0201876 | A1* | 9/2006 | Jordan | B01D 61/145 210/609 |
| 2007/0017867 | A1* | 1/2007 | Pedros | C02F 3/06 210/615 |
| 2009/0294370 | A1* | 12/2009 | Roberts | B01D 21/245 210/694 |
| 2015/0090659 | A1 | 4/2015 | Reid et al. | |

\* cited by examiner

METHOD OF OPERATING AN UPFLOW BACKWASH FILTER

FIELD OF THE DISCLOSURE

A method of operating an upflow backwash denitrification filter and anammox filter (anaerobic ammonium oxidation) is disclosed that comprises receiving an overflow of a wastewater influent from a clarifier basin in a clarifier effluent collection trough; receiving an inflow of the wastewater influent from the clarifier effluent collection trough in a filter influent flow inlet distribution channel; maintaining a substantially constant liquid level in the filter influent distribution channel; applying hydrostatic pressure to push the wastewater influent from the filter influent flow inlet distribution channel into the upflow backwash filter; backwashing the backwash filter with a gas lift adjustable backwash flow; returning filter reject backwash wastewater from a rejection compartment of the upflow backwash filter through a denitrifying bacteria or anammox bacteria recycle return line to a location upstream of the upflow backwash filter; and recycling the denitrifying bacteria or anammox bacteria from said denitrifying bacteria or anammox bacteria recycle return line to any one or more of the clarifier effluent collection trough, the filter influent flocculation tank, or the filter influent flow distribution channel. When the filter medium contains thereon deammonification biomass, the gas is preferably a non-oxygen containing gas. When the filter medium contains thereon denitrifying biomass but not the deammonification biomass, the gas is preferably a non-oxygen containing gas, and if oxygen is present, in an amount of less than 50% of the amount in air.

BACKGROUND OF THE INVENTION

Upflow backwash filters employ a filter medium, for instance a sand bed, through which wastewater ascends. During this process, suspended solids are removed and the treated wastewater collects in a filtrate trough and flows out as treated effluent. The filter medium such as sand, which has caught suspended solids, is drawn from the bottom of the upflow backwash filter through an air lift or gas lift pipe backwash column and cleaned while ascending together with air and water. The sand is separated from the wastewater at a separation section and then further cleaned with filtered water flowing upwards while the sand falls down through a cleaning section.

Thereafter, the sand is uniformly scattered across the top surface of the sand bed by a sand distributor creating a fresh layer of sand capable of filtering suspended solids. These filters are operated employing continuous upflow backwashing and are referred to as "UCBFs".

UCBFs provide a stable treatment process for providing filtered water. The wastewater treatment process operates on a continuous cleaning principle, producing stable and good-quality filtered water under a constant pressure drop. UCBFs have the capability to filter highly contaminated wastewater. Due to their simple structure requiring little supplementary equipment, maintenance of UCBFs is straightforward and operating costs are comparatively low.

Nevertheless, in view of the ever increasing stringent limits on pollutants that may be contained in purified drinking water, a demand exists for UCBFs that can remove larger amounts of pollutants from wastewater, in particular to remove nitrogen present as nitrate, nitrite or ammonia nitrogen. However, it is often necessary to add consumables, such as a carbon source, to the wastewater to increase the nitrogen removal efficiency of the carbonaceous bacteria. Hence, it is desirable to reduce the amounts of consumables necessary for removal of pollutants, especially in view of a potential price increase of these consumables over the operating life of a UCBF.

Known upflow continuous backwash filters, however, have certain disadvantages. For example, the typical operation of a known UCBF creates inefficiencies in the nitrogen removal process because the sand media cleaning process that occurs in the continuous backwash upflow column pipe not only scrubs the sand media but also removes the carbonaceous bacteria that grow on the biomass of the sand media from the wastewater treatment process.

More recently, Applicant has invented an upflow continuous backwash filter system and process that addresses problems of the prior art, which is disclosed in US Patent Application Publication 2015/0090659, the entire disclosure of which is incorporated herein by reference. For instance, the upflow continuous backwash filter system thereof, inter alia, comprises a clarifier basin; a clarifier effluent collection trough being disposed to receive an overflow of wastewater from the clarifier basin; optionally, a filter influent flocculation tank; an upflow continuous backwash filter being disposed to receive the wastewater influent from the clarifier effluent collection trough or the filter influent flocculation tank through a filter influent distribution channel and upflow continuous backwash filter influent pipeline; and a denitrifying bacteria recycle return line being disposed to receive a return flow from a rejection compartment of the upflow continuous backwash filter.

Also disclosed in US Patent Application Publication 2015/0090659 is a method of operating an upflow continuous backwash filter which comprises receiving an overflow of a wastewater influent from a clarifier basin in a clarifier effluent collection trough; optionally, receiving an outflow of the wastewater influent from the clarifier effluent collection trough in a filter influent flocculation tank; receiving an inflow of the wastewater influent from the clarifier effluent collection trough or the filter influent flocculation tank into a filter influent distribution channel and into individual upflow continuous backwash filters; applying hydrostatic pressure to push the wastewater influent from the filter influent distribution channel into the individual upflow continuous backwash filters; and, returning filter reject backwash wastewater from a rejection compartment of the upflow continuous backwash filter and/or from a mixed liquor inflow line or clarifier sludge return inflow line through a denitrifying bacteria recycle return line to a location upstream of the upflow continuous backwash filter.

The buildup of biomass solids on the filter media is what causes the hydraulic headloss to increase through the filter media which in turn causes the liquid level to rise in the filter influent distribution channel or trough. Therefore, notwithstanding the improvements obtained by the inventions according to US Patent Application Publication 2015/0090659, further improvement in the backwashing of the filter media would be desirable.

SUMMARY OF THE DISCLOSURE

The process of the present disclosure is concerned with operating an upflow backwash filter wherein the upflow backwash filter contains a population of denitrifying and/or deammonification anammox biomass on a filter medium, comprising: receiving an overflow of a wastewater influent from a clarifier basin in a clarifier effluent collection trough; optionally receiving an outflow of the wastewater influent from the clarifier effluent collection trough in a filter influent flocculation tank; receiving an inflow of the wastewater influent from the clarifier effluent collection trough or the filter influent flocculation tank in a filter influent flow inlet distribution channel; maintaining a substantially constant liquid level in the filter influent distribution channel; applying hydrostatic pressure to push the wastewater influent from the filter influent flow inlet distribution channel into the upflow backwash filter; backwashing the backwash filter with gas lift backwash flow; returning filter reject backwash wastewater from a rejection compartment of the upflow backwash filter through a denitrifying bacteria or anammox bacteria recycle return line to a location upstream of the upflow backwash filter; optionally, returning biomass from at least one of a mixed liquor flow line and a return activated sludge (RAS) flow line to the location upstream of the upflow backwash filter, and recycling the denitrifying and/or anammox bacteria, respectively, from the denitrifying or anammox bacteria recycle return line to any one or more of the clarifier effluent collection trough, the filter influent flocculation tank, or the filter influent flow distribution channel.

Although the gas for the gas-lift could be air, when the filter medium contains thereon deammonification biomass, the gas is preferably a non-oxygen containing gas. When the filter medium contains thereon denitrifying biomass but not the deammonification biomass, the gas is preferably a non-oxygen containing gas, and if oxygen is present, in an amount of less than 50% of the amount in air.

In addition according to the present disclosure, biomass solids accumulation in the filter creates a head loss which can be used to control, for instance, maintain or minimize hydraulic head drop and wastewater aeration during wastewater flow transfer from the upstream clarifier or other upstream treatment units into the filter influent flow distribution channel. The filter backwash rate, volume, time, time intervals or a combination of these backwash options can be controlled to keep enough biomass accumulation in the filter in order to maintain the liquid level in the upstream filter influent distribution channel at a sufficiently high elevation to minimize the hydraulic head drop from the upstream treatment units and minimize the aeration of dissolved oxygen (DO) concentration in the filter influent wastewater. The term "upstream treatment units" refers to the clarifier effluent collection trough, the filter influent flocculation tank, and the filter influent flow distribution channel.

The process of the present disclosure can be carried out using the system disclosed in US Patent Application Publication 2015/0090659.

BRIEF DESCRIPTION OF THE DRAWINGS

The present disclosure will now be described with reference to the drawings wherein.

DESCRIPTION OF THE BEST AND VARIOUS EMBODIMENTS

Figure 1:
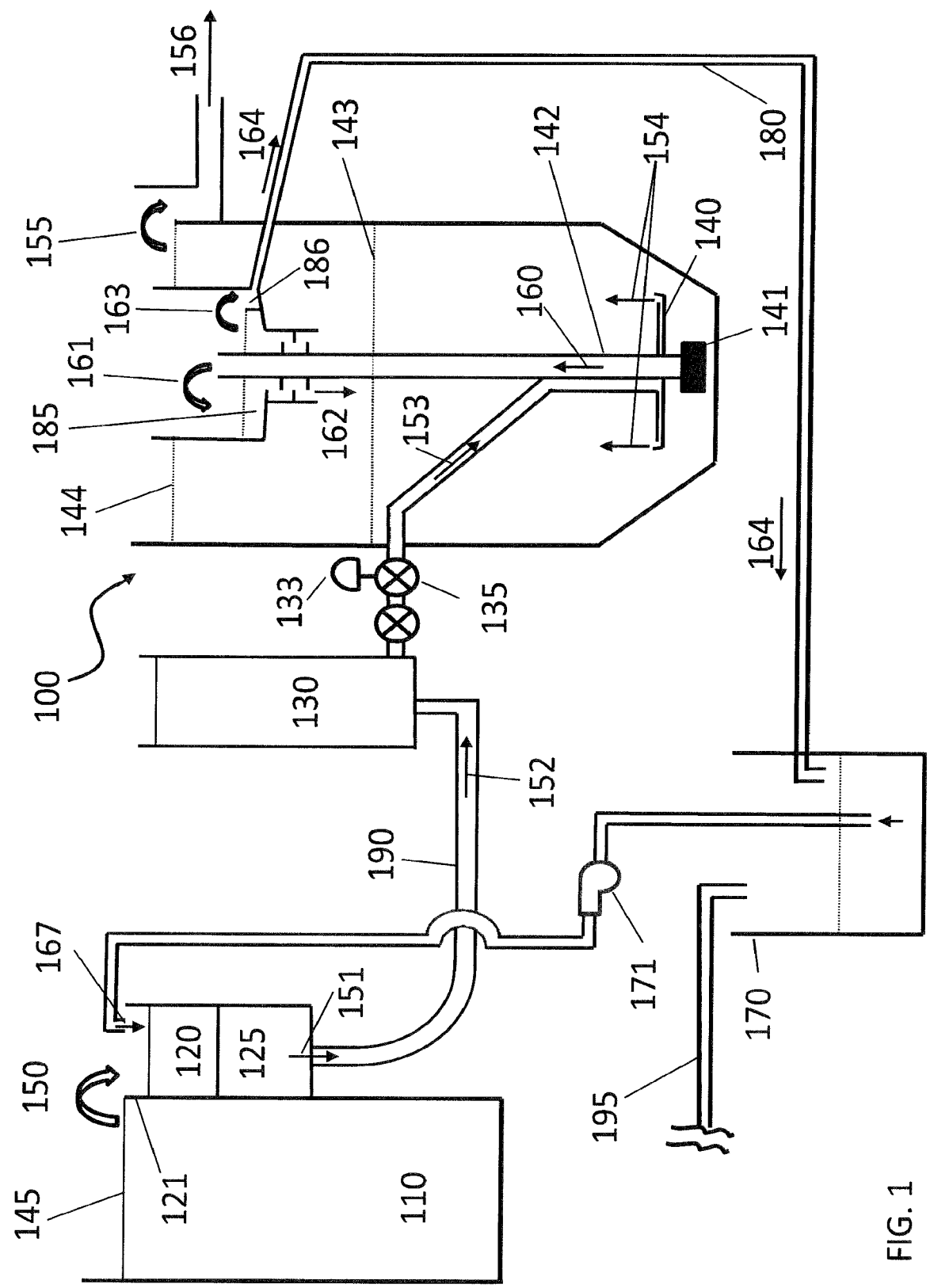
FIG. 1 depicts a schematic view of a wastewater treatment system including an upflow backwash filter 100 and a recycle line 180.

The foregoing and other objects, aspects, and advantages will be better understood from the following detailed description of the best and various embodiments. Throughout the various views and illustrative embodiments of the present disclosure, like reference numbers are used to designate like elements.

In a particular embodiment, the process of the present disclosure comprises receiving an overflow of a wastewater influent from a clarifier basin in a clarifier effluent collection trough; and optionally receiving an outflow of the wastewater influent from the clarifier effluent collection trough in a filter influent flocculation tank, which can also be referred to as a biomass recycle mixing tank.

The process further comprises receiving an inflow of the wastewater influent from the clarifier effluent collection trough or the filter influent flocculation tank (biomass recycle mixing tank) in a filter influent flow inlet distribution channel. A substantially constant liquid level is maintained in the filter influent distribution channel. A substantially constant herein means that the liquid level of the wastewater is typically maintained within a range of from 90% to 110% of a starting level, and more typically within a range of from 95% to 105% of a starting level. The liquid level can be maintained at the substantially constant liquid level by automatically adjusting the automatic filter influent positioning valve or by controlling the biomass accumulation and head loss through the filter. The biomass accumulation and head loss through the filter can be controlled by control of the filter backwash rate, volume, time, time intervals or a combination of these backwash options.

The upstream liquid level in the filter influent distribution channel is maintained at an adequately high liquid level to minimize wastewater aeration and dissolved oxygen (DO) concentration in the denitrification filter or anammox filter influent wastewater flow. In the case of denitrifying bacteria, the dissolved oxygen (DO) concentration is typically less than 0.5 mg/l, and preferably 0.0 to 0.30 mg/L. In the case of anammox bacteria, the dissolved oxygen (DO) concentration is typically less than 0.1 mg/l and preferably 0.0 to 0.10 mg/L. An adequately high level refers to it being high enough to prevent too much hydraulic liquid surface drop and hydraulic grade line drop which would cause the wastewater flowing into the filters to be aerated thereby raising the DO concentration in the wastewater above the values disclosed above, which is undesirable for denitrifying bacteria in the denitrification process used to remove nitrate nitrogen; and inhibiting for anammox bacteria in the deammonification process used to remove nitrogen by anaerobic ammonium oxidation.

Deammonification involves a two-step process that comprises partial nitritation of ammonia (oxidation of ammonium to nitrite) and the subsequent anaerobic oxidation of residual ammonia by nitrite to nitrogen gas. Please see Ramalingam et al., Analyzing anammox, WE&T, WWW.WEFORG/MAGAZINE, September 2012, pages 56-59, the entire disclosure of which is incorporated herein by reference.

The anammox bacteria used for high efficiency nitrogen removal from the blend of influent ammonia (ammonium) and nitrite nitrogen would grow, reproduce and accumulate on the upflow Anammox Filter using a non-oxygen containing gas lift backwash. Along these lines, the anammox bacteria will grow or become prevalent on the filter media when the filter influent contains the correct blend of ammonia nitrogen loading (45%) plus nitrite nitrogen loading (55%) plus low carbonaceous BOD (biochemical oxygen demand) loading in a very low DO<0.0 to 0.1 mg/L DO wastewater mixture. Please see FIG. 5 and the discussion thereof herein below.

Hydrostatic pressure is applied to push the wastewater influent from the filter influent flow inlet distribution channel into the upflow backwash filters. The typical desired head loss is up to a maximum of about 4 to 5 feet through the upflow back filter.

The backwash filter is backwashed with a gas lift backwash flow that could be controlled by varying the gas flow rate in the filter backwash upflow column or by varying the cycle time between backwashes or by cycling the gas flow on and off.

The backwash time and rate can be intermittent (off and on) or could be continuous and constant with only a sufficient amount of total filter backwash reject wastewater volume recycled back to the flocculation tank or filter influent distribution channel in order to maintain the desired head loss through the filter media and resulting filter influent distribution channel liquid surface elevation.

The buildup of biomass solids on the filter media causes the hydraulic head loss to increase through the filter media which in turn causes the liquid level to rise in the filter influent distribution channel or trough. Accordingly, the process of the present disclosure makes possible a process whereby the filters would not necessarily be backwashed continuously, but only periodically for enough time to maintain an approximately constant desired liquid level in the filter influent distribution channel as required to minimize the aeration of and dissolved oxygen (DO) concentration in the denitrification filter or anammox filter influent wastewater flow.

The process of this invention could utilize continuous backwashing since the bacteria contained in the backwash wastewater flow can be simply recycled back to the influent wastewater mixture flowing back into the filter. The point is that the accumulation of bacteria in the filter media produced head loss in the filter media which causes the water surface elevation in the filter influent distribution through to rise in order to produce enough head to get the flow through the filter media.

This disclosure uses controlled filter backwashing to maintain sufficient bacteria accumulation in the filter media to keep the water surface elevation in the filter influent distribution channel high enough to minimize hydraulic head drop and resulting wastewater aeration and DO concentration in the filter influent flow while keeping the same water surface elevation low enough to allow the required wastewater influent flow rate into and through the filters. This backwash controlling method could use backwash time, backwash rate or a combination of both, or continuous backwashing as required to maintain the desired water surface elevation in the filter influent distribution channel. These conditions can be determined by those of ordinary skill in the art once aware of this disclosure without undue experimentation.

The process of the present disclosure makes it possible to limit and control the backwashing frequency of the filters and maintain a sufficiently high head loss through the filters to cause the filter influent distribution to operate a sufficiently high liquid level to minimize hydraulic head drop from the upstream clarifier overflow to the liquid level in the filter influent distribution channel or trough. This in turn minimizes the aeration of and the dissolved oxygen (DO) concentration in the wastewater flowing from the clarifiers into the denitrification or anammox filters.

The filter backwashing frequency and gas lift backwash flow rate when intermittent can be controlled to maintain a much higher hydraulic head loss, if desired through the filter media than with the typical filter operation with a continuous backwash flow. The upstream liquid level in the filter influent distribution trough would be maintained at a relatively constant and adequately high liquid level to minimize wastewater aeration and DO concentration in the denitrification or anammox filters. These conditions can also be determined by those of ordinary skill in the art once aware of this disclosure without undue experimentation. Examples of suitable non-oxygen containing gases are nitrogen gas and $CO_2$. A blend of air with a non-oxygen containing gas can be used when the filter medium contains thereon denitrifying biomass but preferably not the deammonification biomass, wherein the oxygen is preferably present in an amount of less than 50% of the amount in air. In any case, the gas is preferably a non-oxygen containing gas.

The process further comprises returning filter reject backwash wastewater from a rejection compartment of the upflow backwash filters through a denitrifying bacteria or anammox bacteria recycle return line to a location upstream of the upflow backwash filter; optionally, returning biomass from at least one of a mixed liquor flow line and a return activated sludge (RAS) flow line to the location upstream of the upflow backwash filter, and recycling the denitrifying bacteria or anammox bacteria from the denitrifying bacteria or anammox bacteria recycle return line to any one or more of the clarifier effluent collection trough, the filter influent flocculation tank, or the filter influent flow distribution channel.

The bacteria recycle return line comprises a reject backwash wastewater collection recycle pump station. In another particular embodiment, the elevation of the liquid level of wastewater in the clarifier effluent collection trough or the filter influent flocculation tank relative to the liquid level in the upflow backwash filter is less than or equal to a predetermined value in order to reduce hydraulic head drop and consequent wastewater aeration and resultant increased dissolved oxygen concentration in the wastewater as the wastewater flows by gravity from the clarifier effluent collection trough into the filter influent distribution channel, i.e., the elevation of a liquid level of wastewater in the clarifier effluent collection trough or the filter influent flocculation tank over a liquid level in the filter influent distribution trough is minimized to a predetermined value and preferably less than or equal to 1.0 ft, as required to transfer wastewater flow from the clarifier effluent trough to the filter influent distribution channel.

Typically, the location upstream of the upflow backwash filter is the filter influent flocculation tank. Also, a dosed amount of a carbon source solution and returned filter reject backwash wastewater containing wastewater denitrifying bacteria or anammox bacteria can be mixed with the wastewater influent to obtain a mixture and the mixture is reacted in the filter influent flocculation tank.

In a typical embodiment, the location upstream of the upflow backwash filter is selected from the group consisting of a filter structure influent pipeline, the filter influent distribution channel, and an individual upflow backwash filter influent pipeline from among one or more upflow backwash filter influent pipelines.

With particularity, a concentration of dissolved oxygen at an intake port of the upflow backwash filter is less than or the same as the concentration of dissolved oxygen within the clarification effluent collection trough. Specifically, the inclusion of the liquid level control unit prevents or substantially reduces the amount of oxygen transferred to the wastewater prior to its inflow into the backwash filter. Thus, by avoiding an increase of dissolved oxygen in the wastewater a desired anoxic low dissolved oxygen concentration is maintained such that the denitrification process or deammonification process can be effectively and efficiently achieved.

Also with particularity, the liquid level in the clarifier effluent collection trough and/or the filter influent flocculation tank can be maintained substantially constant by automatically adjusting the automatic filter influent positioning valve. Substantially constant as mentioned above, a range of from 90% to 110% of a starting level, more preferably within a range of from 95% to 105% of a starting level.

In another particular embodiment, the concentration of dissolved oxygen in the filter influent distribution trough of the upflow backwash filter is of from 0.0 to 0.3 mg/L. In yet another particular denitrification embodiment, a carbon source solution is added to the influent wastewater prior to the inflow into the upflow backwash filter. With particularity, the carbon source solution comprises a member selected from the group consisting of methanol, high quality waste glycerin, sugar-based waste products or acetic acid, or a mixture thereof. However, it is also possible to add commercially available carbon sources for wastewater denitrification, such as MicroC™ from Environmental Operating Solutions, Inc., or PolySweet™ from Polytec, Inc. A carbon source is not required for an anammox deammonification process.

Also with particularity, the carbon source is added in an amount of from 2 mg/L to 5 mg/L per mg/L nitrate nitrogen to the filter wastewater influent.

In a typical embodiment, the filter influent flocculation tank is selected as the location upstream of the upflow backwash filter. In another typical embodiment, a dosed carbon source solution and wastewater denitrifying bacteria or anammox bacteria contained in the returned filter reject backwash wastewater with the wastewater influent are mixed to obtain a mixture, and the mixture is reacted in the filter influent flocculation tank.

Turning to the drawings, FIG. 1 shows a preferred embodiment of an upflow backwash filter wastewater treatment system. Wastewater having liquid level 145 flows from a clarifier basin 110 over a clarifier basin weir 121 into a clarifier effluent trough 120 in the direction of arrow 150. The clarifier effluent trough is provided with a dropbox 125 from where wastewater enters an upflow backwash filter influent pipeline 190, as indicated by arrow 151. Thereafter, the wastewater having a direction of flow as indicated by arrow 152 enters the filter influent flow distribution channel.

The outflow from the liquid level control unit is regulated by valve 135, which is automatically adjusted by flow regulator 133. The operation of the liquid level control unit is explained in more detail with regard to FIG. 2. From the liquid level control unit, wastewater flows in the direction of arrow 153 through a filter influent flow inlet distribution pipe 140, which opens into the base of upflow backwash filter 100. Wastewater enters in the direction of arrows 154 into the flow influent zone of the backwash filter 100, which is filled with a filtering medium, typically sand; up to filtering media fill level 143. However, other filtering media, such as gravel, alumina or silica may also be employed. Nevertheless, it is preferred to use sand as the filtering medium. The wastewater is pushed through the filtering medium inside the backwash filter by hydrostatic pressure, which results from the elevation of liquid level or differences in height of the fill levels within the liquid level control unit 130 and the fill level 144 of the treated effluent in the backwash filter.

A relatively deep bed filter of about 40 inches to about 80 inches in depth is typically employed.

The sand in the sand bed scrubs off biomass and total suspended solids (TSS) from the wastewater during the rise of the wastewater through the sand bed. Further, carbonaceous bacteria or anammox bacteria grow in the biomass in the filter sand media, which play a pivotal role in the nitrogen removal process taking place in the sand bed. Treated effluent, which is now free of biomass, continuously flows over a weir as indicated by arrow 155 into an exit pipeline 156.

Biomass accumulates on the sand and would, if not removed, hinder the ability of the sand to provide the required hydraulic filtering capacity and remove TSS from wastewater entering the backwash filter. Thus, a center column backwash upflow pipe 142 is provided, which uses a gas lift pumping to draw dirty sand medium from the bottom of the filter (flow influent zone) through a sand media scrubbing-mixing pipe column 141. The gas lift 160 pushes sand upwards towards its discharge end and into a sedimentation zone 185, as indicated by arrow 161. While in the gas lift, sand is subjected to agitation which loosens and removes biomass from the sand's surface, thereby regenerating the sand for further biomass removal by providing accessible surface area for biomass attachment. In the sedimentation zone 185 adjacent to the discharge end of the gas pipe, backwash wastewater called reject water is separated from the backwashed or clean sand. Discharged sand returns to the sand bed after cascading through a return funnel in the direction of arrow 162. In the case of an anammox process, preferably an oxygen free gas is used.

Figure 3:
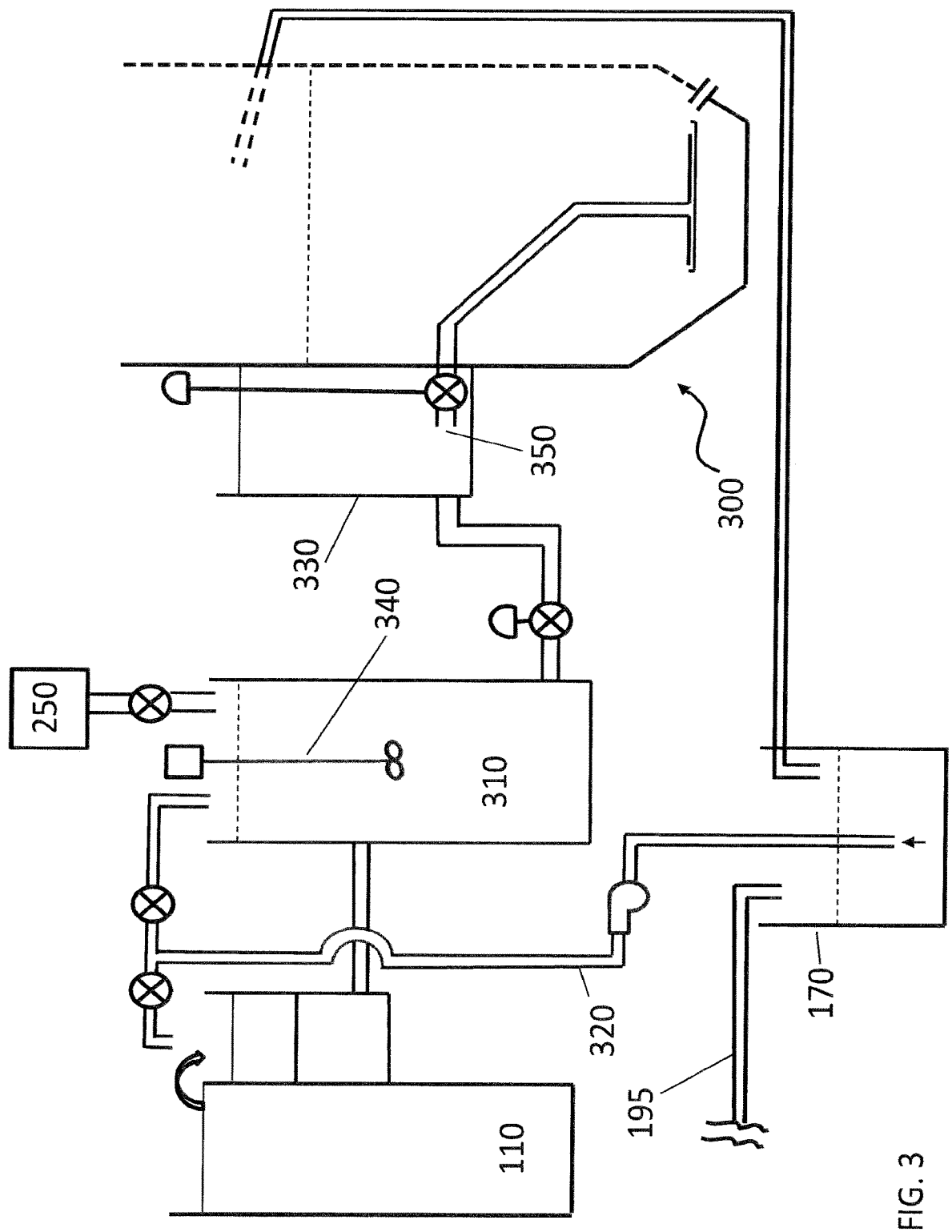
FIG. 3 depicts a schematic view of a wastewater treatment system including a filter influent flocculation tank 310 and a recycle line 320.

Discharged sand returns to the filter bed after cascading through a return funnel in the direction of arrow 162. A small portion of rising water entering the return funnel in countercurrent further cleanses the cascading sand. Biomass and largely untreated wastewater obtained in the sedimentation zone will be referred to herein as reject water. Specifically, reject water is discharged on the top of the filter bed into rejection compartment 186, as indicated by arrow 163, and conducted by gravity flow as indicated by arrow 164 through denitrifying bacteria recycle or anammox bacteria return line 180 to a reject backwash wastewater collection-recycle pump station, which includes a recycle return tank 170 and a wastewater pump 171. The reject water is pumped by the wastewater pump 171 of the reject wastewater collection pump station upstream to the filter clarification trough 120, as indicated by arrow 167. However, the reject backwash wastewater collection-recycle pump station may also be disposed to pump the reject water to the clarifier basin or to a filter influent flocculation tank 310 as depicted in FIG. 3. Optionally, biomass from a mixed liquor flow line and/or a return activated sludge (RAS) flow line 195 may be added to the reject backwash wastewater collection-recycle pump station or directly into the flocculation tank 310 or dropbox 125.

It is noted that undesirable bacteria wasting process is eliminated in the process of the present disclosure. Thus, the concentration and mass of attached growth bacteria present in the filter sand media increases, which allows for efficient nitrate nitrogen removal by biological denitrification or nitrite and ammonia removal by deammonification. Filter reject backwash wastewater can be collected from all or part of the upflow backwash filters to the filter influent pump station wet well during operation and recycle this reject flow as a denitrifying bacteria or anammox bacteria sludge recycle flow either to the filter structure influent pipeline, to the flocculation tank 310, to the filter influent trough, or to the individual filter influent feed pipelines. Thereby, the scrubbing and loss or wasting of denitrifying bacteria or anammox bacteria is avoided, and the denitrifying bacteria or anammox bacteria population weight can be built up much faster and controlled at a higher level or concentration in the upflow backwash filter sand media.

Figure 2:
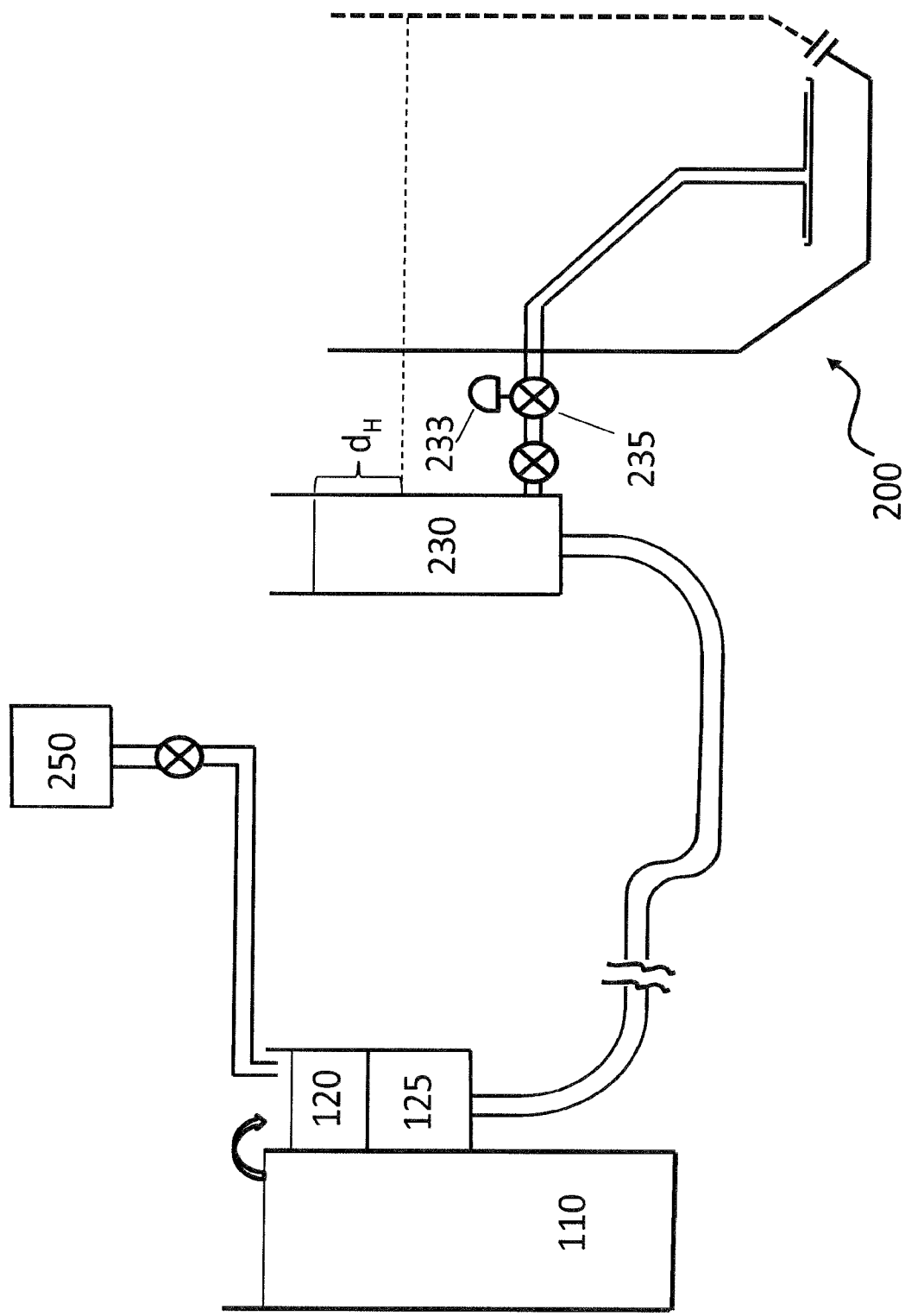
FIG. 2 depicts a schematic view of a wastewater treatment system including a clarifier basin 110, an upflow backwash filter 200, and a liquid level control unit 230.

FIG. 2 depicts another preferred embodiment of the disclosure. Wastewater flows from a clarifier basin 110 into a filter clarification trough 120 and the dropbox 125 as described above with respect to FIG. 1. A filter influent flocculation tank (not depicted) may optionally be provided downstream of the clarification trough. Subsequently, the wastewater flows into a liquid level control unit 230. Valve 235 is automatically adjusted by flow regulator 233 to maintain a head drop between the wastewater level within the liquid level control unit and the clarifier effluent trough 120. Further, a carbon source solution is stored in storage container 250 and can be metered into the filter clarification trough 120.

The operating principle of backwash filters 200 and 300 corresponds to backwash filter 100. For clarity, the system components within upflow backwash filters 200 and 300 are largely omitted and/or depicted with dashed lines. Further, while not depicted, it is within the scope of the disclosure herein to provide a bacteria recycle line for the preferred embodiment of FIG. 2.

Another aspect of the upflow backwash filters herein is that the liquid level in the filter influent trough should be designed to be able to rise to about 1.2 m (approximately four feet) to provide adequate hydraulic head to force wastewater through the filters at design maximum or peak wastewater flow rates or when the filter influent wastewater has higher suspended solids concentrations. To provide this necessary available hydraulic head in the filtration process, a hydraulic profile results which requires a typical liquid level drop or fall of about 1.5 m (approximately 5 feet) or more from the final clarifiers or clarification process into the upflow backwash filter. Preferably, the hydraulic head is of from about 0.9 m to about 1.8 m and more preferably of from about 1.2 m to about 1.5 m.

However, without a liquid level control unit this liquid level drop causes flow turbulence, air induction, and undesirable wastewater aeration that raises the dissolved oxygen (DO) concentration upstream of the process influent wastewater from several parts per million up to 4 mg/L to 7 mg/L and thereby interferes with the denitrification process or anammox process which requires a low DO concentration of 0.0 to 0.3 mg/L. In order to achieve satisfactory denitrification in the filters, this DO concentration must be reduced by excess dosage of methanol or other suitable carbon source solutions into the process influent wastewater flow, for example by metering in carbon source solution from storage container 250.

This disclosure provides a method for treating wastewater that significantly reduces this undesirable aeration and high DO concentration in the influent wastewater flow of the upflow backwash filters and thereby increase the growth rate of denitrifying or anammox attached growth bacteria in the filter. It is possible to eliminate the need to dose excess carbon source chemical solution into the upflow backwash filter influent flow to remove dissolved oxygen by aerobic bacteria growth, and, to minimize the carbon source chemical solution dosage necessary to achieve the required final effluent nitrate, nitrite and ammonia nitrogen concentration.

FIG. 3 depicts another preferred embodiment in which a filter influent flocculation tank 310 is provided between the clarifier basin and the backwash filter 300 having liquid level control unit 330. Toward the bottom of the liquid level control unit a filter influent distribution channel 350 is provided. The liquid level in the filter influent distribution channel which distributes flow into the backwash filter is controlled by the filter influent valves. Inside the flocculation tank small particles in the wastewater coagulate and then adhere to each other to form flocculated suspended aggregate. In this embodiment, the recycle line 320 returns the reject water to denitrifying bacteria or anammox bacteria recycle return tank 170. Further, biomass from a mixed liquor flow line and/or a return activated sludge (RAS) flow line 195 may optionally be added to the tank 170 or to flocculation tank 310. The biomass contained in the mixed liquor or the RAS ultimately reaches the upflow backwash filter pumped to the filter influent flocculation tank with the aid of pump 171.

Accordingly, in a preferred embodiment of the disclosure, a wastewater treatment system is provided that includes a recycle line and a liquid level control unit.

In the preferred embodiment shown in FIG. 3, an optional mixer 340 may be installed. In one aspect of this disclosure, the flocculation tank is operated as a reactor tank by mixing a dosed amount of carbon source solution from storage container 250 and wastewater denitrifying bacteria contained in the returned filter reject backwash wastewater recycled with recycle line 320 with the wastewater influent flowing in from clarifier basin 110. The resulting mixture is then reacted in the filter influent flocculation tank 310.

Figure 4:
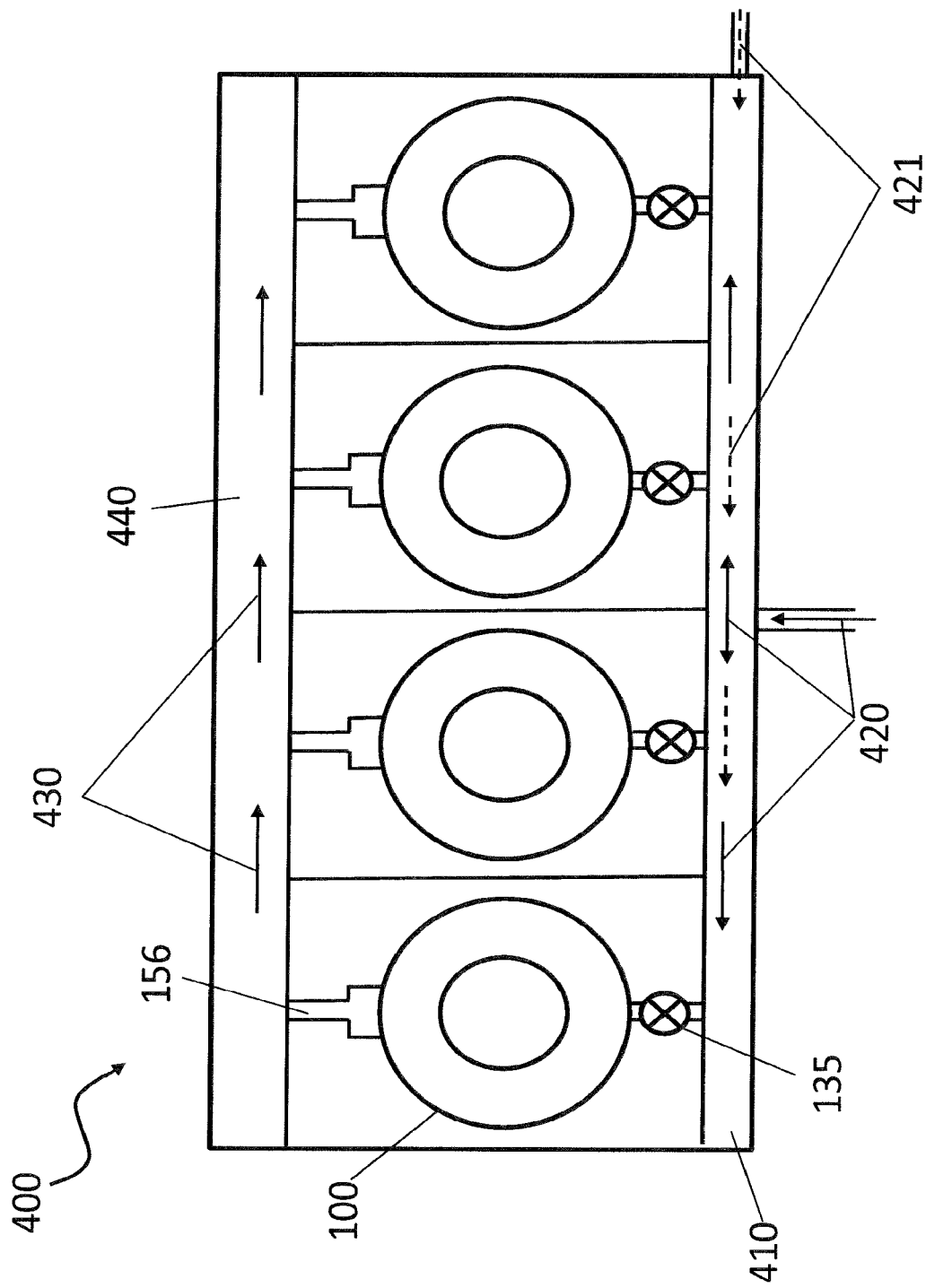
FIG. 4 depicts an overhead view of an upflow backwash filter system having a plurality of upflow backwash filters 100 in a concrete filter structure.

In FIG. 4 a concrete filter system structure 400 is depicted in which four upflow backwash filters 100 are arranged. However, it is also possible to provide fewer than four or more than four filters. This plurality of filters is arranged to receive wastewater from a filter influent distribution channel 410 common to all four filters. The wastewater may, for example, be an effluent received from filter influent flocculation tank 310. The location for the filter influent pipeline for the concrete filter system structure is not particularly limited. For example, effluent may enter the structure 400 from the mid-point of the filter influent distribution channel 410 and flow to all four filters following solid arrows 420 or effluent may enter from the side and flow through filter influent distribution channel 410 in the direction of dashed arrows 421. Each upflow backwash filter is provided with a manual on-off flow valve. However, multiple automatic valves, which automatically control and throttle the effluent, may also be provided to maintain a substantially constant liquid level in the filter influent distribution channel 410 to back up the liquid level control in the flocculation tank and/or clarifier effluent collection trough to minimize wastewater aeration upstream of the filters. The filter influent distribution channel 410 can, therefore, be operated as a liquid level control unit. However, it is also possible to operate the flocculation tank upstream of the filter influent distribution channel as a liquid level control unit. It is also possible to use head loss in the filter created by the biomass to control the liquid level.

For instance, biomass solids accumulation in the filter creates a head loss which can be used to control, for instance, maintain or minimize hydraulic head drop and wastewater aeration during wastewater flow transfer from the upstream clarifier or other upstream treatment units into the filter influent flow distribution channel. The filter backwash rate, volume, time, time intervals or a combination of these backwash options can be controlled to keep enough biomass accumulation in the filter in order to maintain the liquid level in the upstream filter influent distribution channel at a sufficiently high elevation to minimize the hydraulic head drop from the upstream treatment units and minimize the aeration of dissolved oxygen (DO) concentration in the filter influent wastewater.

In the concrete filter system structure each individual upflow backwash filter has a designated filter influent valve 135 and influent pipeline. Treated effluent is discharged through exit pipeline 156 into a filter effluent collection channel 440 common to all four upflow backwash filters where a combined treated effluent flow 430 can be collected.

In a preferred embodiment, the embodiment shown in FIG. 3 may be operated to maintain a population of denitrifying biomass or anammox biomass. Specifically, the embodiment of FIG. 3 is operated in a process akin to return activated sludge (RAS) wastewater treatment by recycling filter reject flow like return from the denitrifying filters or deammonification filters backwash wastewater back into the filter influent flocculation tank or filter influent distribution channel in order to maintain a desired or required weight or population of denitrifying biomass into the denitrifying filter system or anammox biomass in the deammonification filters in which biomass must also be wasted like a waste activated sludge (WAS) flow or discarded filter reject wastewater flow in order to prevent excessive solids accumulation and hydraulic pressure drop or head loss through the same filter media.

Figure 5:
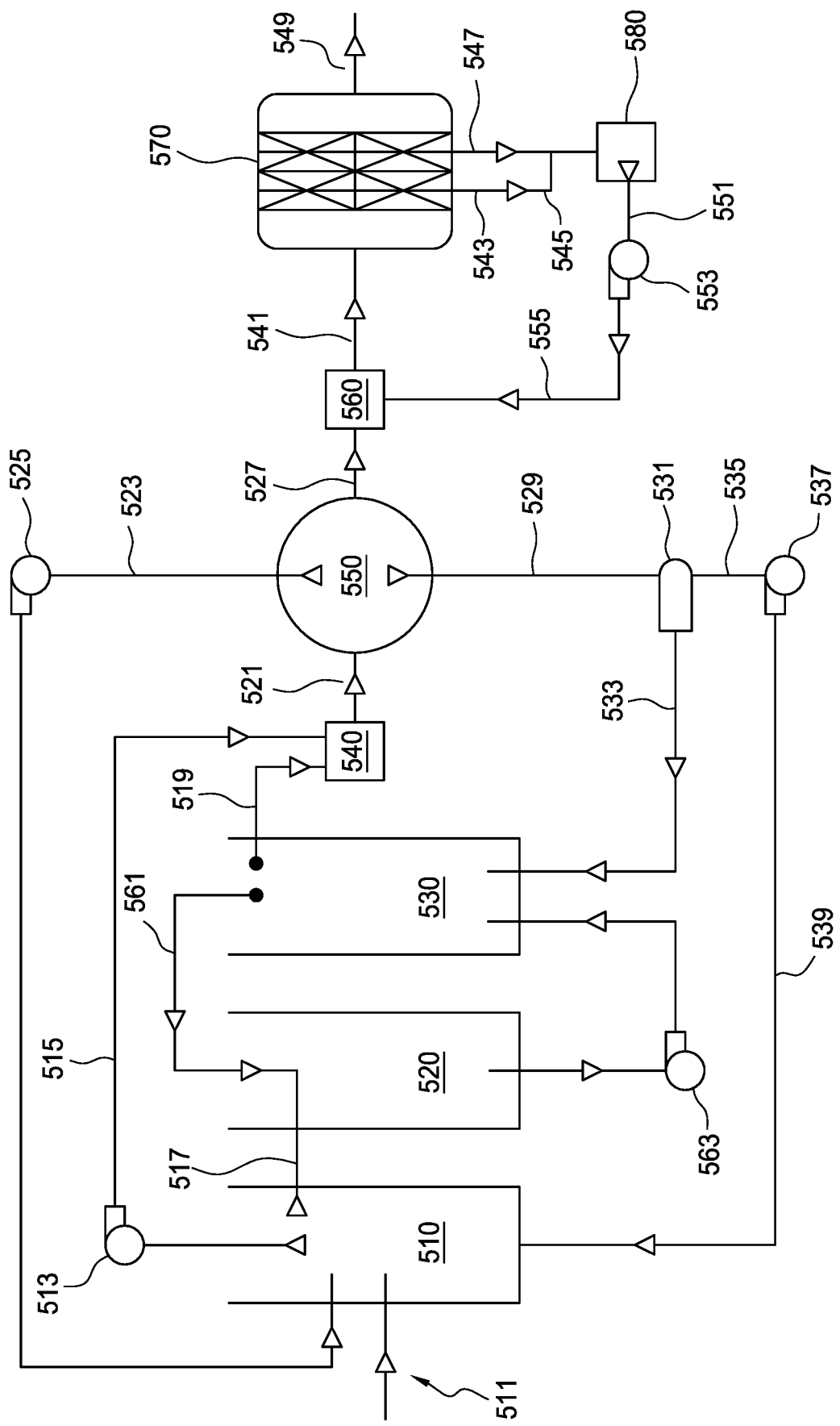
FIG. 5 depicts a schematic view of a wastewater treatment system comprising a combination of a denitrification filter and anammox filter.

FIG. 5 illustrates a preferred embodiment for an anammox filter process. An influent stream having an elevated raw wastewater concentration of BOD and ammonia nitrogen but no nitrite nitrogen is conducted to reactor 510 via conduit 511. The reactor 510 is a flow equalization reactor or constant volume reactor. Return activated sludge (RAS) is pumped from clarifier 550 to reactor 510 via conduit 525 and/or conduit 539. Effluent from reactor 510 which has approximately a 45% nitrogen loading and reduced concentration of BOD is pumped to flocculation tank 540 via conduit 515. The effluent from reactor 510 is a mixed liquor flow from reactor 510 of the supernatant with reduced BOD and with raw wastewater ammonia nitrogen.

The effluent from reactor 510 is also introduced into reactor 520 via conduit 517. The reactor 520 is a flow equalization reactor or constant volume reactor. Also, effluent from nitration reactor 530 is introduced into reactor 520 via conduit 561. Effluent from reactor 520 is pumped to nitration reactor 530 via conduit 563. Effluent from reactor 520 has approximately a 55% nitrogen loading and reduced concentration of BOD.

Effluent from nitration reactor 530 is introduced into flocculation tank 540 via conduit 519. This effluent is a mixed liquor flow of the supernatant with low BOD and with nitrite nitrogen. The partially treated wastewater mixed in flocculation tank 540 is a blend of approximately 45% wastewater with reduced BOD and elevated ammonia nitrogen and no nitrate nitrogen, and, 55% wastewater with low BOD, low ammonia nitrogen and elevated nitrite nitrogen concentration.

Return activated sludge (RAS) is pumped to nitration reactor 530 via conduit 533 from clarifier 550. Effluent from clarifier 550 is also conveyed to flocculation tank 560 via conduit 527. This effluent is clarified and partially treated wastewater with a mixture of low BOD, diluted ammonia N and diluted nitrite N which flows into the anammox filter reactor 570 for deamination of nitrogen. Effluent from flocculation tank 560 is conveyed to anammox filter reactor 570. Effluent from anammox filter reactor 570 is recycled back to reactor 510 via conduit 549. Filter rejects or backwash wastewater recycle is conveyed to water pump station 580 via conduit 547.

Filter rejects or backwash wastewater recycle recycled from water pump station 580 are pumped to flocculation tank 560 via conduits 551 and 555.

In the context of this disclosure, the flow of wastewater through the treatment system can be viewed as a stream flowing from the filter structure influent pipeline, and in turn, the clarifier basin, the collection trough, optionally the flocculation tank, optionally the liquid level control unit, the filter influent distribution channel, and the filter bed. Thus, the term upstream is a relative term that for a given system component refers to a location of the wastewater treatment system from where the wastewater is directly or indirectly received; whereas, the term downstream refers to a location to which the wastewater will flow from the given system component. The embodiments described hereinabove are further intended to explain best modes known of practicing the disclosure and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purpose, as if each individual publication, patent or patent application were specifically and individually indicated to be incorporated by reference. In the case of inconsistencies, the present disclosure will prevail.

It is understood that the foregoing description is that of the preferred embodiments of the invention and that various changes and modifications may be made thereto without departing from the spirit and scope of the invention as defined in the appended claims.

What is claimed is:

1. A method of operating one or more upflow backwash filters, wherein the one or more upflow backwash filters contain a population of denitrifying biomass or deammonification biomass or both on a filter medium, wherein the method comprising:
receiving an overflow of a wastewater influent from a clarifier basin in a clarifier effluent collection trough;
optionally, receiving an outflow of the wastewater influent from the clarifier effluent collection trough in a filter influent flocculation tank;

receiving an inflow of the wastewater influent from the clarifier effluent collection trough or the filter influent flocculation tank in a filter influent flow inlet distribution channel;
maintaining a substantially constant liquid level in the filter influent flow inlet distribution channel;
applying hydrostatic pressure to push the wastewater influent from the filter influent flow inlet distribution channel into the one or more upflow backwash filters;
backwashing the backwash filter with a gas lift backwash flow wherein the gas is a non-oxygen containing gas or a blend of air with a non-oxygen containing gas when the filter medium contains thereon denitrifying biomass but not the deammonification biomass, provided the oxygen is present in an amount less than 50% of the amount in air;
returning filter reject backwash wastewater from a rejection compartment of the one or more upflow backwash filters through a denitrifying bacteria or anammox bacteria recycle return line to a location upstream of the upflow backwash filter;
optionally, returning biomass from at least one of a mixed liquor flow line and a return activated sludge (RAS) flow line to the location upstream of the upflow backwash filters;
recycling said denitrifying bacteria or anammox bacteria from said denitrifying bacteria or anammox bacteria recycle return line to at least one of said clarifier effluent collection trough, said filter influent flocculation tank, or the filter influent flow distribution channel.

2. The method according to claim 1, wherein biomass solids accumulation in the filter creates a head loss which controls hydraulic head drop and wastewater aeration during wastewater flow transfer from at least one of said clarifier effluent collection trough, or said filter influent flocculation tank, into the filter influent flow distribution channel.

3. The method according to claim 1, which comprises controlling at least one of the filter backwash rate, volume, time, or time intervals to keep sufficient biomass accumulation in the filter in order to maintain the liquid level in the upstream filter influent distribution channel at a sufficiently high elevation to thereby minimize hydraulic head drop from upstream treatment units and minimize the aeration of dissolved oxygen (DO) concentration in the filter influent wastewater.

4. The method according to claim 1, further comprising receiving the wastewater influent from the clarifier effluent collection trough or the filter influent flocculation tank in a liquid level control unit,
wherein the wastewater influent exits the liquid level control unit into a filter influent distribution channel and flows by gravity into the one or more upflow backwash filters.

5. The method according to claim 1, wherein the location upstream of the one or more upflow backwash filters is the filter influent flocculation tank, and the method further comprises:
mixing a dosed amount of a carbon source solution, returned filter reject backwash wastewater, and, optionally, the returned biomass from the at least one of the mixed liquor flow line and the RAS flow line with the wastewater influent to obtain a mixture; and,
reacting the mixture in the filter influent flocculation tank.

6. The method according to claim 1, which further comprises receiving an outflow of the wastewater influent from the clarifier effluent collection trough in a filter influent flocculation tank.

7. The method according to claim 1, which further comprises returning biomass from at least one of a mixed liquor flow line and a return activated sludge (RAS) flow line to the location upstream of the upflow backwash filter.

8. A method of operating at least one upflow backwash filter, wherein the upflow backwash filter contains a population of denitrifying biomass or anammox biomass or both on a filter medium, wherein the method comprises:
receiving an overflow of a wastewater influent from a clarifier effluent collection trough or from a filter influent flocculation tank;
receiving an outflow of the wastewater influent into a filter influent distribution channel of a liquid level control unit having at least one automatic filter influent positioning valve;
maintaining a liquid level of the wastewater influent in the clarifier effluent collection trough or the filter influent flocculation tank or a filter influent distribution channel within a predetermined range;
conducting the wastewater influent into the at least one upflow backwash filter;
backwashing the backwash filter with a gas lift backwash flow wherein the gas is a non-oxygen containing gas or a blend of air with a non-oxygen containing gas when the filter medium contains thereon denitrifying biomass but not the deammonification biomass, provided the oxygen is present in an amount less than 50% of the amount in air;
returning filter reject backwash wastewater from a rejection compartment of the upflow backwash filter with a denitrifying bacteria or anammox bacteria recycle return line to a location upstream of the upflow backwash filter;
optionally, returning biomass from at least one of a mixed liquor flow line and a return activated sludge (RAS) flow line to a location upstream of the at least one upflow backwash filter, and
recycling said denitrifying bacteria or anammox bacteria from said denitrifying bacteria or anammox bacteria recycle return line to any one or more of the clarifier effluent collection trough, the filter influent flocculation tank, or the filter influent distribution channel.

9. The method according to claim 8, wherein the maintaining the liquid level comprises automatically adjusting the at least one automatic filter influent positioning valves to maintain a substantially constant liquid level in the clarifier effluent collection trough or the filter influent flocculation tank or the filter influent distribution channel.

10. The method according to claim 8, wherein a concentration of dissolved oxygen at an intake port of the upflow backwash filter is less than 1.0 mg/L for denitrifying biomass or the same as the concentration of dissolved oxygen within the clarifier effluent collection trough or the filter influent flocculation tank or less than 0.5 mg/L for anammox biomass or the same as the concentration of dissolved oxygen within the clarifier effluent collection trough or the filter influent flocculation tank.

11. The method according to claim 8, wherein the liquid level of the wastewater is maintained within a range of from 90% to 110% of a starting level.

12. The method according to claim 8, wherein the liquid level of the wastewater is maintained within a range of from 95% to 105% of a starting level.

13. The method according to claim 8, wherein a concentration of dissolved oxygen in the filter influent distribution trough of the upflow backwash filter is of from 0.0 mg/L to 0.3 mg/L.

14. The method according to claim 8 wherein a carbon source solution is added to the influent wastewater prior to the inflow into the upflow backwash denitrifying filter.

15. The method according to claim 14, wherein the carbon source solution is selected from the group consisting of methanol, glycerin, sugar-based waste product, and acetic acid, or a mixture thereof.

16. The method according to claim 15, further comprising adding the carbon source solution in an amount of from 2 mg/L to 5 mg/L per mg/L nitrate nitrogen in a filter influent wastewater.

17. The method according to claim 8, further comprising maintaining a dissolved oxygen concentration of the wastewater influent received in the filter influent distribution channel, which does not require a carbon source solution to be dosed into the influent wastewater prior to the inflow into the upflow backwash filter to reduce wastewater dissolved oxygen concentration.

18. The method according to claim 8, which further comprises receiving an outflow of the wastewater influent from the clarifier effluent collection trough in a filter influent flocculation tank.

19. The method according to claim 8, which further comprises returning biomass from at least one of a mixed liquor flow line and a return activated sludge (RAS) flow line to the location upstream of the upflow backwash filter.

20. A method of operating one or more upflow backwash filters wherein the one or more upflow backwash filters contain a population of denitrifying biomass or deammonification biomass or both on a filter medium, wherein the method comprising:

receiving an overflow of a wastewater influent from a clarifier basin in a clarifier effluent collection trough;

optionally, receiving an outflow of the wastewater influent from the clarifier effluent collection trough in a filter influent flocculation tank;

receiving an inflow of the wastewater influent from the clarifier effluent collection trough or the filter influent flocculation tank in a filter influent flow inlet distribution channel;

maintaining a substantially constant liquid level in filter influent distribution channel;

applying hydrostatic pressure to push the wastewater influent from the filter influent flow inlet distribution channel into the one or more upflow backwash filters;

backwashing the backwash filter with a gas lift backwash flow wherein the gas is selected from the group consisting of air, a non-oxygen containing gas or a blend of air with a non-oxygen containing gas; wherein the filter backwash rate, volume, time, time intervals or a combination of therein is controlled to keep sufficient biomass accumulation in the filter in order to maintain the liquid level in the upstream filter influent distribution channel at an elevation sufficient to minimize hydraulic head drop from upstream treatment units and minimize the aeration of dissolved oxygen (DO) concentration in the filter influent wastewater;

returning filter reject backwash wastewater from a rejection compartment of the one or more up flow backwash filters with a denitrifying bacteria or anammox bacteria recycle return line to a location upstream of the upflow backwash filter;

optionally, returning biomass from at least one of a mixed liquor flow line and a return activated sludge (RAS) flow line to the location upstream of recycling said denitrifying bacteria or anammox bacteria from said denitrifying bacteria or anammox bacteria recycle return line to at least one of said clarifier effluent collection trough, said filter influent flocculation tank, or the filter influent flow distribution channel.

* * * * *